Oct. 3, 1939.　　　J. G. RAY ET AL　　　2,174,946
AUTOROTATIVE-WINGED AIRCRAFT
Filed April 2, 1935　　　5 Sheets-Sheet 1
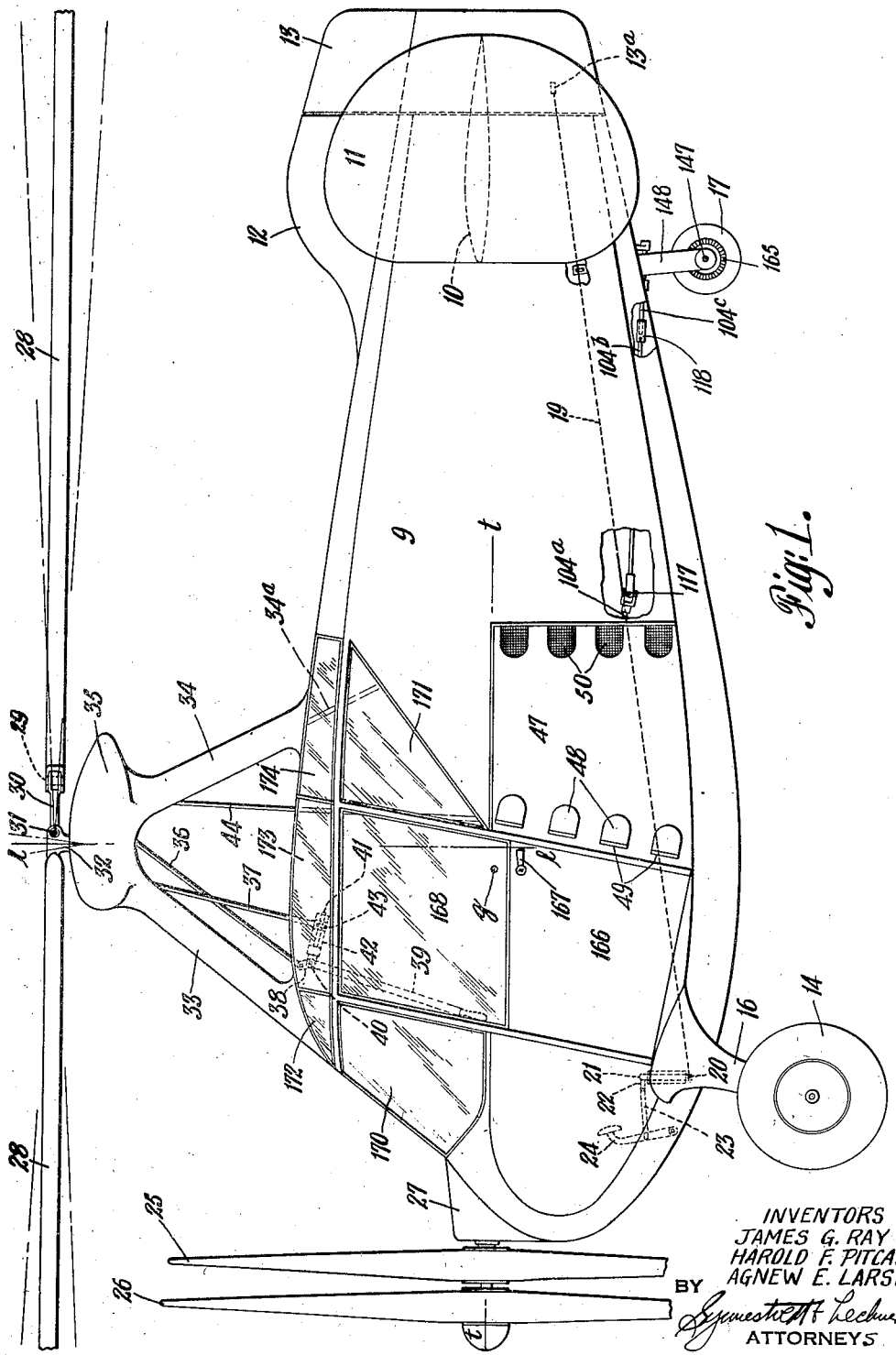
INVENTORS
JAMES G. RAY
HAROLD F. PITCAIRN
AGNEW E. LARSEN
BY
ATTORNEYS

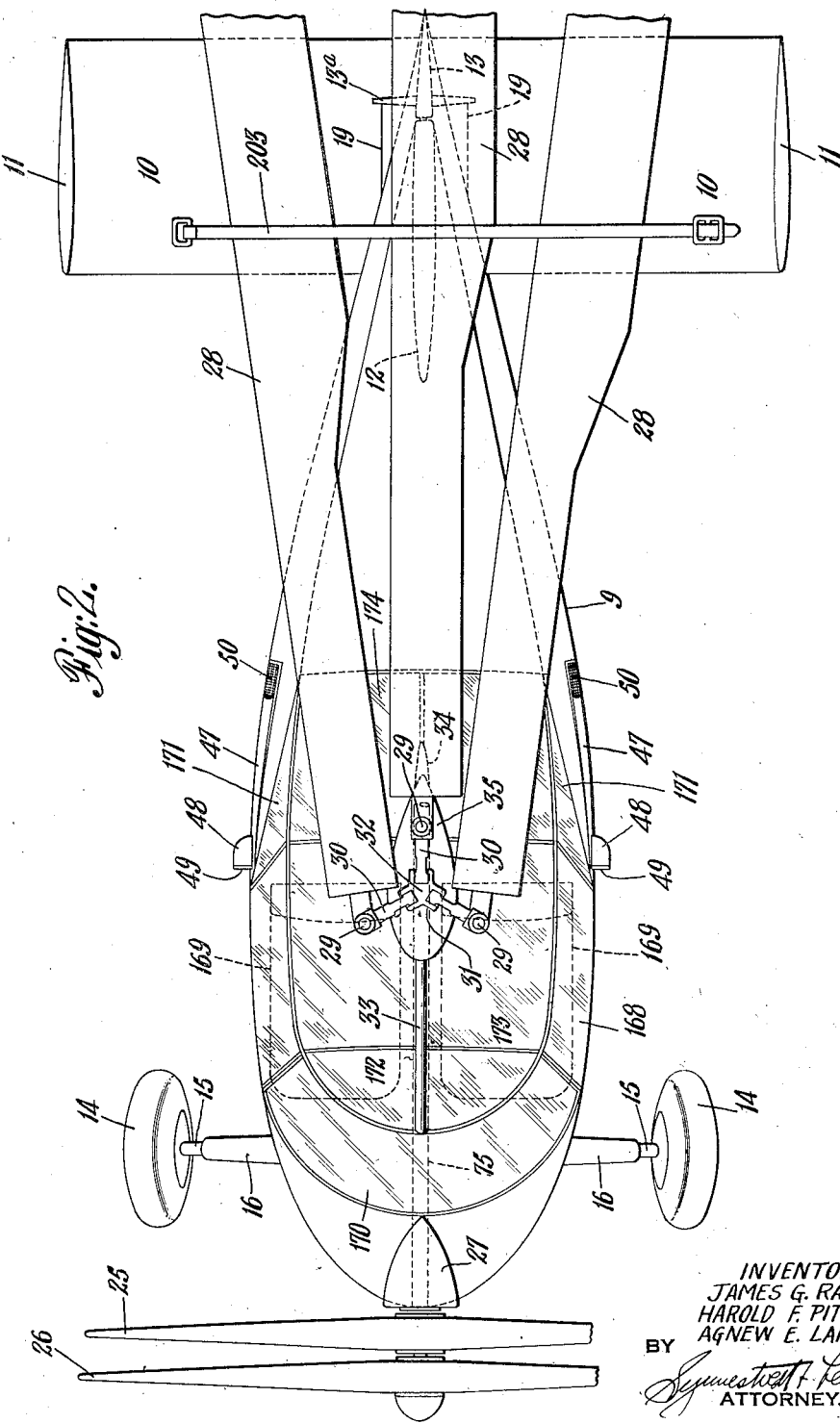

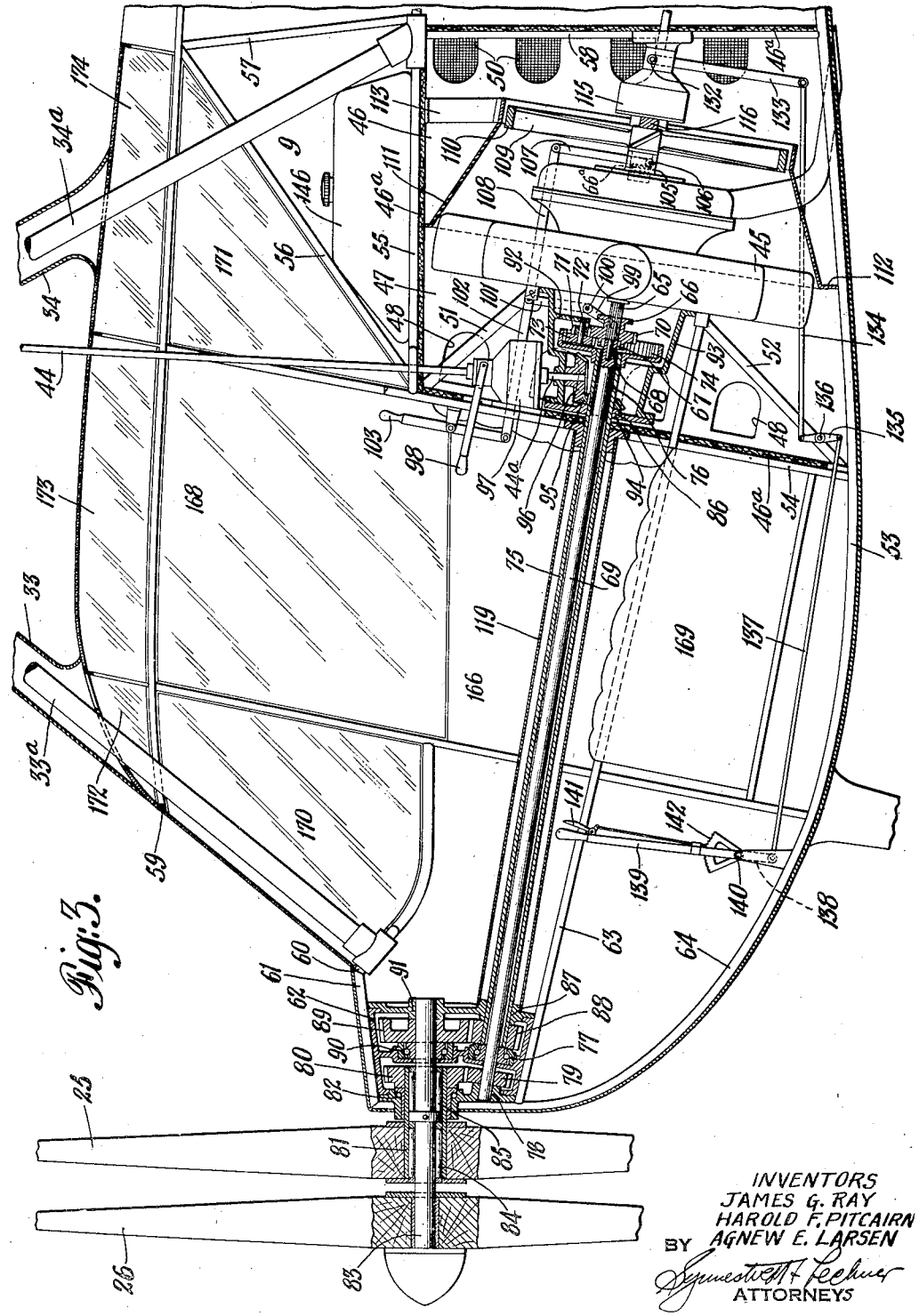

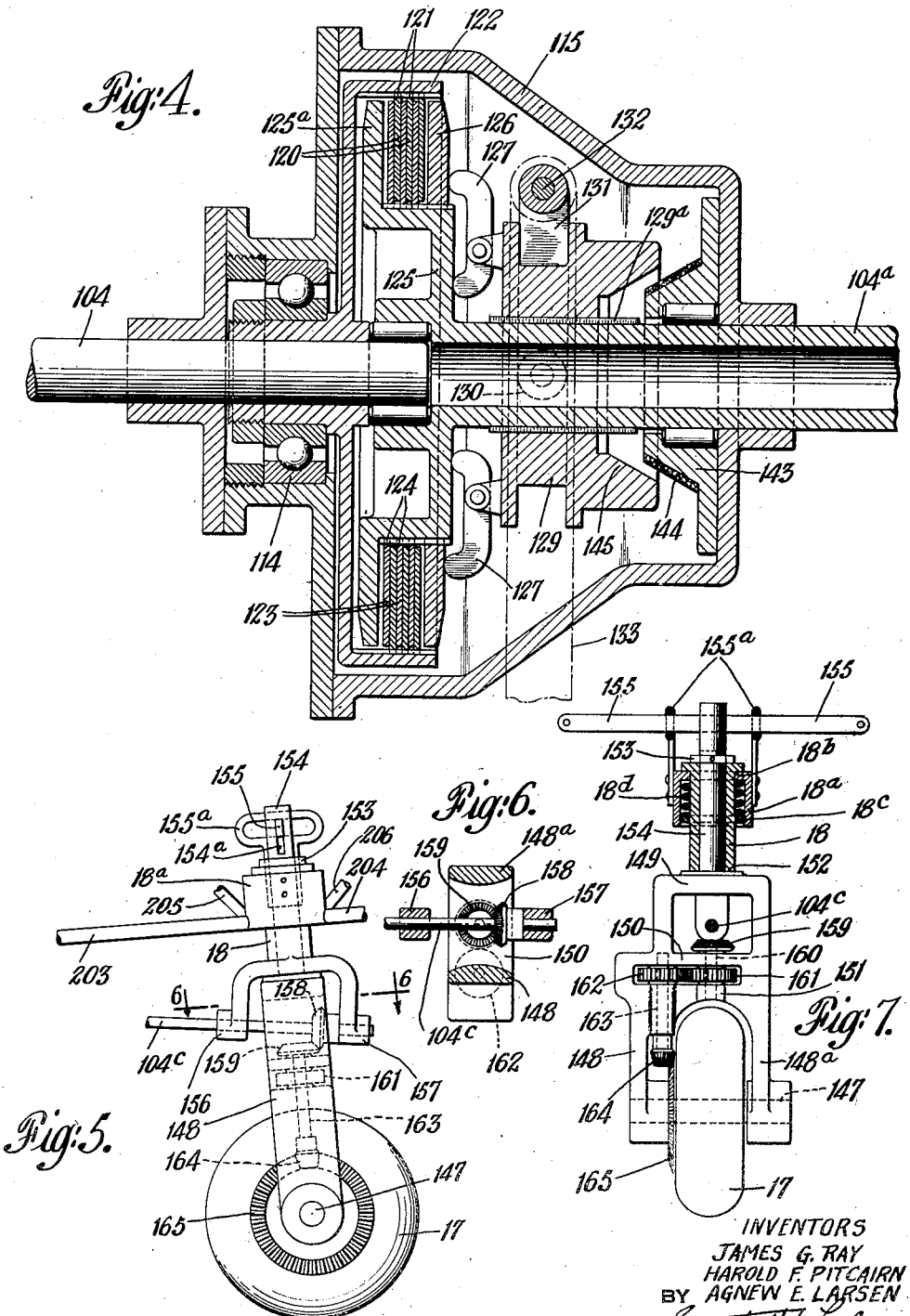

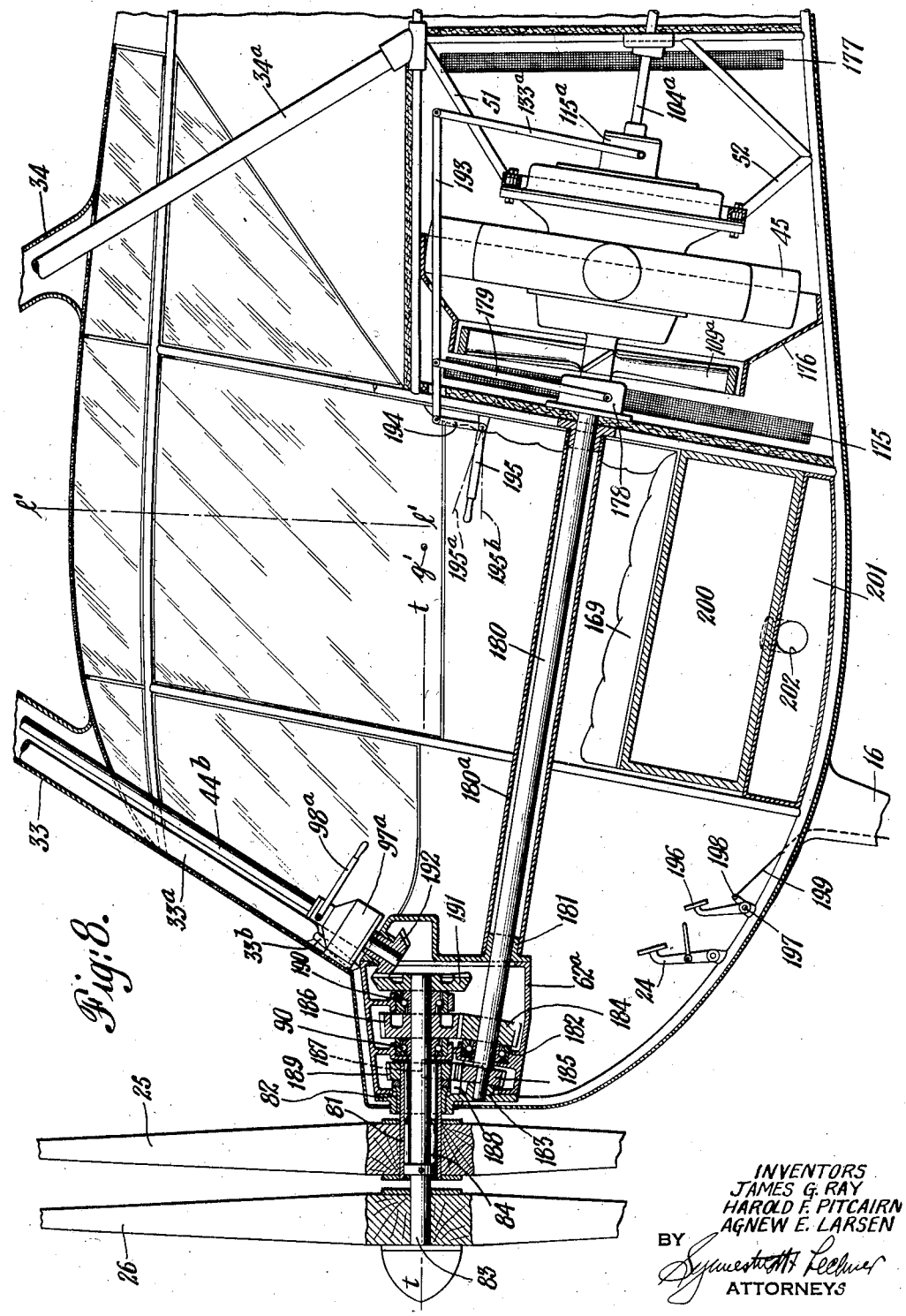

Patented Oct. 3, 1939

2,174,946

UNITED STATES PATENT OFFICE 2,174,946

AUTOROTATIVE-WINGED AIRCRAFT

James G. Ray, Hatboro, Harold F. Pitcairn, Bryn Athyn, and Agnew E. Larsen, Huntingdon Valley, Pa., assignors, by mesne assignments, to Autogiro Company of America, a corporation of Delaware Application April 2, 1935, Serial No. 14,304

25 Claims. (Cl. 244—18)

This invention relates to aircraft, particularly to rotative-winged aircraft, and contemplates, in general, a new and useful disposition of some of the major elements of such a machine, and also the incorporation of a number of new features in advantageous cooperative relationship with each other and with several of the known essentials of such a machine.

While not limited in its application, the invention is especially useful in and applicable to a rotary-winged aircraft in which the rotor is normally autorotationally actuated in flight, and in which such rotor constitutes the primary or sole means of sustension and control of the craft; and it is as applied to this particular type of craft that the invention is herein described and illustrated. In view of this, a brief outline of the structure, operation and purposes of that particular type of rotary-winged machine will be set forth, prior to a statement of the more specific objects and advantages of the present invention.

In the type of rotary-winged aircraft in which the burdens of sustension and control are wholly or largely imposed directly upon a normally autorotating rotor (as exemplified for instance in the United States application of Juan de la Cierva, Serial No. 645,985, filed December 6, 1932, which is based upon and illustrated in issued British Patent No. 393,976, accepted June 16, 1933), the major essentials of the structure are: a body which has itself or in conjunction with tail surfaces a certain degree of "weathercock" stability, so to speak; an undercarriage or other suitable alighting mechanism; a means of propulsion, such as one or more engines driving a propeller or propellers; and a rotor comprising a hub or axis member with a plurality of sustaining wings pivoted or flexibly mounted on the hub and positioned or capable of being positioned so as to be rotated about the hub axis by the relative air flow in flight, and means for varying the position of the lift or thrust line of the rotor with respect to the center of gravity of the machine, such for example as a universally tiltable mounting for the hub, with suitable control connections operatable from the pilot's compartment. It is also desirable that such machine be provided with means for applying power to the rotor, to start or initiate rotation thereof prior to or during take-off, for instance a disconnectible driving system coupling the rotor to the propulsion engine.

In the operation of such a machine, the propulsion is normally effected by the usual propeller; the sustension is effected by the autorotationally turning wings; and the control is effected preferably by tilting the axis of the rotor, laterally for banking and turning and longitudinally for climbing and diving. Since such a machine is capable, in addition to high speed flight, of quick or sharp take-off and substantially vertical descent, the operating conditions differ substantially from those encountered in the ordinary airplane. A high degree of metacentrical stability is obviously desirable, and this has heretofore been obtained by locating the center of intersection of the several rotary wings at a point substantially elevated above the center of gravity of the machine as a whole. Minimization of the excursions of the center of gravity from a predetermined point, as by variation in the loading, is important in order to obtain proper balance and stability, as for example in vertical descent. It is desirable to so locate all parts of the structure and so dispose the arrangements for variable loads that the average position of the center of gravity lies substantially along the average thrust line of the propulsion means and near the average position of the rotor lift line, or slightly ahead of it in vertical descent, in order to obtain good average balance and stability with engine on or off and during either translational or vertical flight movements of the craft. Because of the wide range of flight directions and attitudes of which the machine is capable, it is important to get as wide a range of angles of vision as possible, from the pilot's cockpit or compartment. Since aerodynamic action for stabilizing and controlling the craft is at a minimum in some of the flight maneuvers of which this machine is capable and since the machine has very little inherent damping in the direction of roll, it is clearly of substantial consequence that undesirable overturning moments and the like, such as that resulting from propeller torque reaction, be reduced to a minimum. Because of the ability of the machine to get in and out of small spaces and to fly slowly with safety at low altitudes, it is quite possible to operate such a machine under conditions of weather and terrain which would be prohibitive to the operation of the ordinary airplane, and for this reason it is desirable, for the extension of these useful characteristics, that the machine be capable of travelling on the ground or along a road from one landing place to another point of take-off when necessary.

With all of the foregoing structural and operational characteristics the present invention very nicely cooperates, and it is in general an object of the invention to obtain the various functions and purposes above outlined, or to obtain them in fuller measure and in a more practical way than heretofore possible.

More particularly, it is an object of the present invention to increase the metacentrical stability of rotary-winged aircraft without raising the rotor location, or alternatively to maintain as good or better stability and at the same time lower the rotor location; this being accomplished by lowering the center of gravity, preferably by lowering the position of heavy masses such as the engine. By the invention, the dropping of the center of gravity in this manner renders it possible to lower the location of the rotor, if desired, which still further lowers the center of gravity and results also in making it possible to use a shorter rotor supporting pylon. This in turn makes feasible a lighter pylon construction, since the moment arm acting to distort the pylon under the flight and ground loads is shortened. Lowering the center of gravity also improves ground stability and as a result the undercarriage can be of relatively narrow tread, with accompanying reduction in size, weight and drag.

Another object of the invention is to so locate the heavy fixed structure, such as engine, propellers, gearing, etc., that the movable or disposable loads may be located to best advantage with relation to the normal average location of the rotor lift line, whereby reduction of the excursions or movements of the center of gravity, by variation in loading, is obtained.

Heretofore, in order to obtain an approximation of the desired locations of the center of gravity, the propeller thrust line and rotor lift line, it has been necessary, in some machines, because of the relatively high center of gravity of the craft, to incline the axis of the propeller, under which condition the propeller thrust had a downward component, which opposed to some extent the lift of the rotor. It is a further object of the present invention, by lowering the center of gravity, to make it practicable to locate the propeller axis substantially in line with the horizontal longitudinal axis of the craft and to actually lower the location of the propelling means and still maintain the proper relationship between the factors referred to. As a result, the invention contemplates increase in efficiency of the machine because of the reduction or elimination of the downward thrust component of the propeller. By relatively separating the engine and the propeller, and/or by driving the propeller through gearing, great flexibility as to propeller location is obtained, and the propeller axis can be easily arranged for the best conditions of flight equilibrium. Furthermore, by moving the engine rearwardly, or separating it from the propeller location, and driving through shafting and gearing or the like, it is possible to place the propeller farther forward, without making it difficult to locate the center of gravity at the desired point, and it is further possible by locating the propeller well forwardly, to improve the ground clearance, and to attain the desired location of the propeller thrust line with respect to the center of gravity of the craft, for various locations of the center of gravity, with a minimum shift in the angle of the propeller axis.

By virtue of the more favorable propeller location thus resulting and/or by removal of the engine from its normal location in the nose of the craft to a position behind a space or compartment for one or more occupants and/or variable load, the invention contemplates widening the angle of vision from the occupants' compartment, particularly in a downward direction over the nose.

Allied with the foregoing, the invention contemplates the advantages of reducing the noise, vibration and fire hazard, by so separating the engine from the propeller location and by placing it in a separate compartment, enclosed by fire walls. Cleanliness and ventilation are in general improved, and particularly the risk of fumes entering the cabin and of oil being blown over the windshield and the rest of the machine, is substantially eliminated. In this connection, the arrangement also results in protecting the occupants from excessive heat of the engine; and the fuel supply can also be advantageously and safely located, either in front of the fire-insulated engine compartment, or above the same in position for gravity feed.

Another object of the invention is to reduce or minimize undesired forces tending toward instability, such as rolling, by employing a pair of tandem propellers, positioned at the nose, and driven in opposite directions through shafting extending forwardly from the engine, thus neutralizing the propeller torque reaction upon the body. This is particularly important in this type of machine, not only because the absence of fixed wings and ailerons reduces the lateral moment of inertia and eliminates most of the aerodynamic damping in roll, but also since the entire range of tilting of the controlling rotor should be reserved for normal maneuvers and not wasted in counteracting propeller torque.

A further object of the invention is to narrow the tread of the undercarriage, which with a folding rotor, permits of convenient road travel; and to combine with this an engine location so low that adequate flight and road stability are maintained. Means are also provided for holding the folded rotor in place.

The invention further contemplates attainment of the advantage of gearing down the propellers from the engine, and, by employing two propellers, making them of a diameter which is normal or less than normal for a single propeller for a machine of similar size and characteristics, whereby the possibility of lowering the rotor mount, as above mentioned, is further increased.

The invention also contemplates obtaining the reduction in propeller speed and/or the reverse turning of the two propellers either by a single drive shaft or by concentric shafts, passing forwardly from the engine between two side-by-side seats in the occupants' compartment, to the propellers at the nose, with the reversing and/or reducing gearing either mounted in a gear box at the nose or in a gear box mounted on or integral with the engine.

The invention further involves an advantageous disposition of fuselage and bracing structure, and of the rotor supporting pylon legs or struts with reference to the housing or casing for the propeller bearings and gears on the one hand, and the engine housing or engine mount on the other hand; and, in addition, the utilization of the drive system between the engine and propellers for taking off a drive to the rotor from either one of the gear boxes.

It is a further object of the invention to utilize the same engine for driving the craft on the ground by actuating one or more wheels thereof, and the invention further provides for alternative drive to the propellers or the wheeled undercarriage, with means for positively disconnecting the propellers when the machine is being used as a land vehicle and positively disconnecting the wheels when the propellers are connected.

In connection with the foregoing, the invention contemplates an obliquely angled disposition of the engine axis approximately along a line extending from the propeller hubs to the rear wheel, whereby straight-line shafting can be extended forwardly from the engine to the propellers at a slight angle to the horizontal axis of the latter, and straight-line shafting can be extended rearwardly from the engine to the rear wheel along a line which passes close to the wheel, suitable gearing being provided for connecting the respective shaftings to the propellers and wheel. To minimize torque loads and reduce the size of the necessary shafts, said shafts are preferably operated at engine speed, and said gearings respectively provide the necessary speed reductions.

It is a further object of the invention to provide improved means of cooling the engine, within its enclosure, either by slip-stream from the propellers, or by a separate fan blower, or both; and in one embodiment, an interlock is provided between clutching mechanisms, for alternatively connecting the propellers or the wheel to the engine and for operating the blower when the propellers are disconnected. In this embodiment, provision is made for connecting and disconnecting the drive to the rotor at will, when the propellers are connected, and for ensuring disconnection of the rotor when the wheel is connected to the engine. The enclosure of the engine results in smoother and more efficient air-flow around the body, and where two oppositely rotating propellers are employed this advantage is further enhanced by virtue of the practical elimination of slip-stream swirl.

The invention further involves a wheel arrangement providing for cushioning of landing and road shocks, combined with mechanism for steering, braking and driving on the same wheel, the steering being further coupled with the rudder control, and the driving and braking mechanism being interconnected with a common control. During road operation, the rotor and propellers are not only cut out of operation, as aforesaid, but the rotor blades are further provided with means for folding over the tail of the structure, whereby they not only utilize less space (for road travel and for storage) but also impose an additional load on the rear wheel to increase the tractive effect and to improve stability on the road. A gear reduction is made between the driveshaft and the wheel so that a light weight shaft may be used. The engine thus also operates at an efficient speed even when the vehicle is traveling at low speed on the ground, and an effective cooling of the engine is also obtained.

In an alternative arrangement, the road drive is to the rear wheel and brakes are mounted on the front wheels, which effects advantages in weight distribution, gives greater total braking power, and makes possible the use of differential braking effects on the two front wheels to accomplish or assist in the steering of the craft when on the ground.

Various detailed objects and advantages will be evident as the description proceeds, reference being had to the accompanying drawings, in which—

Figure 1 is a side elevational view of an aircraft embodying the present invention, certain of the rotor control parts and tail wheel and rudder operating parts being generally indicated;

Figure 2 is a top plan view of the same machine, with the rotor in folded position;

Figure 3 is an enlarged fragmentary vertical longitudinal section showing the forward part of the machine of Figure 1, and with various parts in elevation, including illustration of the drive to the propellers and of parts of the driving connections to the rotor and to the rear wheel;

Figure 4 is a further enlarged vertical longitudinal section through a combined clutch and brake unit for the rear wheel drive, the casing of which is shown in elevation in Figure 3;

Figure 5 is an enlarged side elevation of the tail wheel assembly of the machine shown in Figure 1;

Figure 6 is a section taken on the line 6—6 of Figure 5;

Figure 7 is a rear elevational view, with parts in section, of the mechanism shown in Figure 5; and Figure 8 is a view similar to Figure 3 but illustrating a modification of the invention.

Referring first to Figures 1 and 2, it will be seen that there is illustrated an aircraft having a body 9 with very substantial horizontal and vertical tail areas 10 and 11, 12, the central vertical fin 12 being trailed by a rudder 13; the whole having appreciable aerodynamic stability with reference to the average location of the center of gravity indicated at g. The undercarriage may comprise a pair of cushion wheels 14 located forward of the center of gravity and preferably mounted by shock absorbing struts 15 within the shell or bracing structure 16; and a cushion wheel 17 adjacent the tail, the latter wheel being swivel-mounted and being controllable by the pilot, conjointly with the rudder if desired, as by means of suitable operating cables 19, each of which may be connected at its rear end to a rudder horn 13a, and at its forward end to a lever at 20 operated by a torque shaft 21, which in turn is actuated by a lever or crank 22 connected by link 23 to the respective rudder pedal 24. The swivel mounting of the tail wheel and its connection with the rudder control, will be described in detail, when reference is made to Figures 5 to 7.

A pair of propellers 25 and 26, is mounted at the nose of the machine in a casing 27 for the bearings and gears. Sustension and control of the machine are effected by a rotor comprising a plurality of (in this instance, three) rotary wings or blades 28, the full length of which is not shown on the drawings, these blades normally extending some distance beyond the rudder. These wings are positioned at an autorotational incidence, and are connected by vertical or drag pivots 29, links 30 and horizontal or flapping pivots 31 to a common hub or central axis of rotation 32 which is mounted for normally free rotation. Flapping or coning of the wings 28 on their pivots 31 is indicated by the dot-and-dash lines. Limits upon the pivotation of the wings about their hinges 29 and 31 may take any suitable form, such, for example, as illustrated in Patent No. 1,994,465, and are preferably arranged to permit folding of the rotor blades to the position shown in Figure 2, by means such as employed in said patent.

It will be understood that the hub 32 is supported upon a pylon comprising forward and rear legs housed with streamline shells 33 and 34, and is mounted by means of mechanism, within the streamline shell 35, for tilting of the rotor axis in every direction, for control purposes, longitudinal tilting of the axis of hub 32 being indicated in dot-and-dash lines. This mounting need not be here shown, as it may take the form of the tilting rotor mounting of the aforementioned British patent.

The drawings, however, illustrate the longitudinal tilting control push rod 36 and the lateral tilting control push rod 37. The first of these rods is pivotally connected to one arm 38 of a bell crank, the other arm 39 of which is extended downwardly to form the control stick in the cabin. The pivot for longitudinal motion of this stick is indicated at 40. Lateral motion of the stick turns the short shaft 41 which is mounted in bearings or a housing structure 42, and actuates the rod 37 through a laterally extending arm 43. The use of a tilting rotor for control purposes is, of course, not per se a part of the present invention, but is claimed in the above mentioned copending application No. 645,985, corresponding to said British patent. Neither do we specifically claim herein, per se, the particular arrangement of control stick and connecting levers and rods, as they form part of the subject matter of copending application of Agnew E. Larsen, Serial No. 39,671, filed September 9, 1935, now Patent 2,155,426, granted April 25, 1939.

Means are also provided for positively driving the rotor, as in starting, comprising a shaft 44 extending up into the shell 35, wherein a large-ratio reduction gear and overrunning clutch (not shown) connect the same to the hub 32. The structure at that point need not be shown, as it may take a number of forms, for example as disclosed in the copending application of Joseph S. Pecker, Serial No. 512,383, filed January 30, 1931 (now Patent 1,999,636, granted April 30, 1935), or as shown in the said British patent of Juan de la Cierva, which discloses flexible joints and other mechanism for accommodating the drive shafting to the control motions of the rotor hub.

Turning now to Figure 3, (in which, for the sake of convenience, there is omitted any disclosure of the rotor control connections) it will be seen that the engine 45, instead of being mounted in the nose of the craft, as is usual practice, is housed within a chamber 46 of the body 9, said chamber or compartment being insulated from the occupants' compartment, and preferably also from the rest of the body, by a sound-deadening and fire-resistant wall or lining 46a, which may, for example, be of an asbestos composition. The sides of this compartment or chamber are closed by removable covers 47, which, as seen also in Figures 1 and 2, carry air inlet scoops 48 which may be provided with screens 49, and screened air outlet louvers 50. The engine is mounted with its axis at an inclination, by means of any suitable mounting or bracing elements, such as 51, 52 which are connected at suitable points of juncture with fuselage framing preferably constituted by metallic tubing 53, 54, 55, 56, 57, 58 and the like. The members 56 and 57, for example, may be arranged to extend diagonally transverse to the fuselage, one of them intersecting at a point of juncture with the rear pylon tube 34a which extends downwardly through its streamline sheath. The rear leg of the pylon may be further interbraced, in any suitable manner, with the fuselage structure surrounding and connected to the engine.

The front pylon leg 33a extends downwardly for a juncture with fuselage elements 59, 60, and the like, to a point adjacent the fuselage framing 61 in which the propeller gear box 62 is mounted. Other bracing, in addition to that shown, may be introduced at this region.

Central fuselage framing 63, 64 preferably interconnects the gear box and the engine mount. It will thus be seen that there is, in general, a rigid triangular structure formed, at the lower rear corner of which is positioned the engine, at the lower forward corner of which is positioned the propeller mechanism, and at the upper apex of which is positioned the rotor and its associated operating parts. A sturdy structure, resistant to distortion, is thus provided.

The drive to the propellers is constituted by the following mechanism: the engine crank shaft 65 has splined thereon a shiftable hub 66 which has internal teeth 67 meshing with the external teeth 68 of the internal drive shaft 69. The hub 66 also carries an external gear 70 meshing with a pinion 71 which is fast on shaft 72, this shaft in turn actuating a gear 73 which is in constant mesh with the internal gear 74 mounted fast on the external drive shaft 75. Shaft 69 at its rear end is journalled on a tail bearing 76 formed on crank shaft 65; and at its forward end is journalled in bearings 77, 78, and carries a pinion 79 constantly meshing with gear 80 fast on shaft 81 of the propeller 25, which propeller shaft is mounted in external bearing mechanism 82 and spaced internally from propeller shaft 83 by means of bearings 84, 85. Shaft 75 is journalled at its rear end in bearing 86, and at its forward end in bearing 87, adjacent to which it carries a pinion 88 constantly engaging the gear 89 fast on the propeller shaft 83, which latter is in turn journalled in bearings 90 and 91, in addition to the two bearings 84 and 85 which are located between the two concentric propeller shafts. It will be understood that the gearing adjacent the engine (in this embodiment) causes the two shafts 69 and 75 to rotate in opposite directions, at crank shaft speed, and that the gearing adjacent the propellers preserves these opposing senses of rotation, but reduces the propeller speed to approximately half that of the crank shaft, although other ratios may be chosen. The bearings in the gear box take the radial and thrust loads of the propellers and the associated gears and shafts. In the occupants' space a protecting sleeve 119 surrounds the shafts 75 and 69, which not only prevents contact with the shafts but can also serve in conjunction with the longitudinal frame members 63 and 64, to brace the engine as against forward dislodgment into the cabin in the event of a collision.

Returning to the gearing at the engine, it will be observed that the countershaft 72 is mounted in webbing 92 formed in the interior of the engine housing 93, and while only one set of gears 71 and 73 is shown in the drawings, it will be understood that several, preferably three, such sets are employed, in equispaced relation about the gear 70, to prevent the imposition of radial thrust upon said gear and upon the internal gear 74 and its shaft 75 and other parts.

Between the gear 74 and the engine cover plate 94 is located a bevel gear 95 fixed on shaft 75 and in constant mesh with a bevel gear 96, mounted on the rotor starter shaft 44a. Connection of starter shaft 44a to the main starter shafting 44 is accomplished by means of a manually operated clutch, the housing of which is shown at 97 and the control lever of which is shown at 98 in the cabin. The internal structure of this clutch need not be illustrated, as it may take one of the forms shown in the aforementioned Pecker application, or any other suitable form, such as shown in United States Patent No. 1,673,232. It will be observed that since the rotor drive is taken off from the propeller drive, the rotor can be operated only when the propellers are connected to the engine.

The propeller drive is in its operative position, in the showing of Figure 3. Disconnection of the drive is effected by means of the fork 99 mounted on rock shaft 100, which passes through the engine casing 93 and is actuated by the external lever 101, pivotally connected by the link 102 with the operating lever 103 located in the occupants' compartment. Lever 103 is shown in its "forward" position, for connection of the propellers. When moved rearwardly, the lever throws the collar member 66 rearwardly along the splines 65, and disconnects the propeller and rotor driving mechanism. The danger of a whirling propeller, when travelling along the road, is thus eliminated, and damage to the folded rotor also prevented. At such time (as seen in Figure 2) the rotor blades are held in place over the tail, as by a removable strap 203.

The drive to the rear wheel is by a take-off shaft 104 (see Figure 4), which is connectible with the rear end of the engine crank shaft by means of a simple dog clutch fragmentarily indicated at 66a within the small housing 105 (Figure 3). An operating shaft 106 extending into this housing for operating the dog clutch is actuated by a lever 107 pivotally connected to the link 108 which is coupled to the main operating link 102 of the lever 103. Directly mounted on the shaft 104 is a fan runner or blower 109 having a weighted rim 110 which fits within the periphery of a conical deflector or shell 111 supported in the chamber 46 as by flange 112 and bracing means 113.

It will now be seen that the clutch members 66 and 66a are interlocked for simultaneous, but opposite, control by means of the lever 103, and that, as soon as the propellers are cut out of operation, thus cutting off the slip-stream flow through the scoops 48 and over the engine to the outlet louvers 50, the blower is immediately cut into operation, so as not only to impose a load upon the engine but also to produce a forced cooling draft over the engine.

Shaft 104 is extended rearwardly beyond the blower, through a bearing structure 114 housed within the clutch-and-brake casing 115 which is supported by a transverse brace 116, and this shaft is arranged to be coupled, at will, with the main drive shafting extending rearwardly to the wheel, the latter shafting being composed of sections 104a, 104b and 104c (see Figure 1), the sections 104a and 104b being connected by a universal joint 117, and the sections 104b and 104c being connected by a slip joint 118.

The clutch for coupling shaft 104 to 104a is housed within the casing 115 and comprises a series of driving plates 120 splined at 121 upon the inside of the driving drum 122, and a series of driven plates 123 splined at 124 upon the driven disk 125. Engagement of the clutch is effected by gripping the alternate driving and driven plates between the peripheral extension 125a of the disk 125 and the compression ring 126, which latter is actuated through a plurality of rockers 127 pivoted at 128 upon the slidable clutch operating ring 129, the latter being splined at 129a on the shaft 104a. Sliding of the clutch operating ring 129 toward the left (in Figure 4) to engage the clutch (or toward the right to disengage it) is effected by means of trunnions 130 carried by the fork member 131 fixed on rock shaft 132. This rock shaft extends outside the casing 115 and on it is fixedly secured the operating lever 133 which is pivotally connected to the forwardly extending link 134 (see Figure 3), which connects up, by means of a rocking lever 135, pivoted at 136, and a second link 137, to the lower arm 138 of a control member 139 pivotally mounted at 140 in the occupants' compartment.

The control lever 139 has a releasing latch device 141 for engaging a toothed quadrant 142. This control also operates the drive shaft brake, now to be described.

Within the casing 115 is a fixed conical brake backing member 143 which is faced with any suitable brake lining material 144. A braking action upon the shaft 104a is obtained by sliding the clutch collar 129 toward the right (in Figure 4) as this collar is formed with a cone brake member 145 cooperating with the brake surfacing material 144. The combined structure 129, 145 is thus utilized to drive or brake the rear wheel of the craft, at will, when operating upon the ground. This mechanism is shown in its neutral position in Figure 4, and the operating lever 139 is shown in its neutral position in Figure 3. It will now be obvious that when the lever 139 is moved forwardly, it causes engagement of the clutch, and when it is moved rearwardly, it engages the brake.

Turning now to Figures 5, 6, and 7, it will be seen that the rear or tail wheel 17 is mounted by an axle 147 in an irregular yoke or fork comprising arms 148, 148a, which are joined by transverse members 149, 150 and 151, which form or receive bearings for the structure now to be described.

The uppermost cross member 149 forms a thrust bearing at 152 to take the load from the sleeve 18 which latter is resiliently mounted in the cylinder 18a fixed in the fuselage of the machine. The member 149 also has a rigid upward extension or shaft 154 journalled in the sleeve 18, serving as the swivel for the tail wheel, and actuated, for steering purposes, by means of the arms or horns 155 which are coupled to the rudder operating cables 19.

The fixed wheel mounting sleeve 18 carries front and rear yoke arms 156 and 157 in which is journalled the shaft member 104c, carrying a bevel gear 158. This gear is in mesh with a bevel gear 159 fixed on a short shaft 160 which is journalled in the two cross members 150 and 151. Between these cross members the shaft 160 carries a gear 161, in constant mesh with a gear 162 fast on shaft 163, which is journalled in the same two cross members 150 and 151, and which extends downwardly to carry a small bevel pinion 164 which is in constant mesh with a large bevel ring gear 165 mounted on the side face of the wheel hub, just within the inner periphery of the resilient portion or tire of the wheel 17.

It will now be seen that in swiveling or steering of the tail wheel, the motion is accommodated, in the driving mechanism, by the fact that gear 162 may travel around gear 161.

This tail wheel mounting and driving assembly is retained in place in its mount 18, by means of the fixed collar 153.

The vertically movable sleeve 18 is fitted slidably in the fixed cylinder or tubular bracket 18a which is rigidly supported as by fuselage members 203, 204, 205 and 206. The tubular member 18a has a top flange 18b, and the member 18 has a flange 18c which may be threaded into place; and a spring 18d is inserted between the inturned flange 18b and the external flange 18c.

Since the whole wheel assembly thus has an up and down movement within the main cylinder 18a, for absorbing road shocks, and since the wheel steering horns 155 should remain in the same plane as the operating cables 19, the horns are preferably mounted in the shaft 154 by means of a slotted opening 154a. A small, fixed guiding yoke 155a is placed to embrace the shaft or axis member 154, at each side thereof, and to embrace the horns 155 above and below the same, so as to permit the steering horns to be turned to prevent them from moving up and down with the wheel assembly. One of the guiding yokes 155a has been omitted from Figure 5, for the sake of clarity.

With reference to the cabin arrangement, it will be seen that there may be a door 166, preferably one on each side of the body, having a latch operating handle 167 and a window 168. This gives ready access to the two side-by-side seats 169 (see Figure 2), and from the compartment thus provided there is an ample range of vision, not only forward, upward and to the side, but also at an angle downwardly over the nose of the craft. Windows 170, 171, 172, 173 and 174 are provided, in addition to the windows in the doors.

It will be obvious that the propeller shafts 69 and 75 are located centrally and pass between the two seats. Similarly, the control levers 39, 98, 103, and 139 may be centrally located, or alternatively one or more of these may be placed toward one side or the other of the cabin, if the machine is to be flown from only one of the seats. In any event, the large variable load of pilot and passenger is placed close to the center of gravity $g$, so that there is little shift in the location of this center with reference to the propeller thrust line $t$—$t$ and the rotor lift line $l$—$l$. Fuel tank 146 is placed just above the engine, for gravity feed, but shielded (inside the fuselage) from the engine compartment.

It will be noted that the propeller thrust line passes close to or intersects a horizontal transverse axis containing the center of gravity, and that the rotor lift line, on the average, also passes close to, and preferably slightly behind such transverse axis and approximately at right angles to the propeller thrust line (although it will be understood that the position of the rotor lift line shifts somewhat forwardly with increase in forward speed of the machine, and is of course also shiftable by means of the rotor tilting controls).

By locating the center of mass of the engine, and other heavy bodies lower than usual, the engine being positioned well below a horizontal plane containing the center of gravity, and connecting the propellers through gearing to operate in a plane above that of the engine, these desirable relationships of lift and thrust lines can be readily obtained, and this is true not only when two propellers are employed, but also in cases where one of the propellers may be omitted, as for example, in machines having some other means for counteracting propeller torque reaction (as shown in Cierva application No. 714,242, filed March 6, 1934 (now Patent 2,098,230, granted November 9, 1937), based on British Patent No. 413,069, accepted July 12, 1934). It will also be evident that the same relationships can be obtained in cases where the engine is connected to drive outboard propellers, or where more than one engine is used. In fact, many of the advantages of the present invention can be obtained regardless of whether one or a plurality of engines and/or propellers be employed. While a radial engine is illustrated in the drawings it will be obvious that other forms of engine may be used, and that they may be liquid-cooled instead of air-cooled.

In the modification shown in Figure 8, the general location of rotor pylon, propellers and engine with reference to each other and to the body, is substantially the same as described with reference to Figures 1 to 7 inclusive. As the rotor itself with its controls, portions of the fuselage and tail structure, the rear wheel assembly, and the wheel and rudder steering controls, if desired, may be similar to the corresponding elements of the first embodiment, these features are omitted from Figure 8, in order to simplify the drawings.

In this form of mechanism, the driving connections from the engine on the one hand, to the propellers, rotor and wheel, on the other hand, differ from those previously described. The engine 45 is mounted in a similar position, but the gear box 93 of the previous arrangement is omitted, and a fan or blower 109a is permanently mounted directly on the crank shaft, at the front end of the engine, where it cooperates with the screened air inlet 175, baffle 176 and air outlet 177 to maintain a constant circulation of cooling air over the engine cylinders whenever the engine is running, regardless of whether the machine is flying, travelling on the ground, or standing idle, and this without the aid or necessity of employing any scoops or relying upon slipstream of the propellers.

Immediately forward of the blower is a clutch mounted in a casing 178, which is operable by means of an operating arm 179 to connect the engine crank shaft directly to a single forwardly extending shaft 180 leading into the propeller gear box 62a. In the gear box, the shaft 180 is journalled by bearings 181, 182 and 183, and carries two gears 184 and 185.

The gear 184 constantly meshes with a gear 186 which is fast on shaft 83 of propeller 26. Gear 185 meshes with a reversing gear 187 which is mounted on the countershaft 188 located toward one side of the gear box. This gear 187 in turn meshes with the gear 189 which is fixed on shaft 81 of propeller 25. By means of this gearing, the speed reduction between shaft 180 and the propellers, and the relative reversal of the drive to the two propellers, are obtained.

Bearings 82, 84, 90 and the like, are employed in a manner similar to the arangement shown in Figure 3. In addition, the shaft 83 is extended rearwardly, through another bearing 190, to drive a gear 191 which engages another gear 192, for actuating the rotor drive shaft 44b. It will be seen that the rotor starter, in this embodiment, runs up along the front leg 33a of the pylon, within the streamline shell 33 (instead of coming up in the rear as in the previous embodiment), and the lower part of the forward pylon leg 33a is divided or forked as at 33b, to straddle the forward portion of the casing 97a of the rotor starter clutch, the operating lever of which is shown at 98a.

Returning now to the engine 45, it will be observed that the wheel drive shaft portion 104a is directly connectible to the rear end of the engine crank shaft by means of a clutch the housing of which is shown at 115a, there being no intermediate dog clutch. This clutch may be similar to that shown in Figure 4, but the wheel brake may be eliminated from this unit, if desired, in view of the employment of front wheel brakes, hereinafter refered to. The operating lever 133a of this clutch is pivotally connected by a link 193 to one arm 194 of a bell crank having its other arm 195 aranged as a control handle in the cabin.

The operating lever 179 of the propeller clutch is preferably coupled to the same operating link 193, as indicated. When the control handle 195 is in position 195a, the propeller clutch is engaged and the wheel driving clutch is disengaged. When the handle 195 is moved slightly, for example to the full line position, the propeller clutch has been disengaged, but the wheel clutch not yet engaged. Upon further movement, for example to the position 195b, the drive to the rear wheel is completed, this additional motion simply moving the propeller clutch further in the direction of disengagement, with no operating effect.

In a position adjacent, and preferably slightly below, each rudder and wheel steering control pedal 24, is a brake pedal 196 pivoted at 197 to operate one of the ordinary front wheel brakes by means of the arm 198 and the tension cable 199 which passes downwardly through the wheel strut fairing 16. The ultimate connection of these cables to the front wheel brakes need not here be illustrated, as such arrangements are now commercially known, and have been adapted to landing gears of both the rigid and oleo types.

The seating arrangement in this embodiment is similar to that previously described. The sleeve 180a, however, around shaft 180, is made as a rigid structural brace, which also relieves the body of the torque load of the propeller drive. In addition, we have here shown the arrangement of a luggage compartment 200 and a gasoline tank 201, beneath the seats 169. The side door arrangement of the cabin gives ready access to the ends of the luggage compartment, and the gasoline tank inlet 202 is conveniently located at one end of the tank, just below the cabin door. In this arrangement, since the rotor starter and all of the gearing are located at the front end of the machine, the engine 45 can be mounted slightly farther forward than in the previous embodiment. These arrangements, and the location of brakes on the front wheels, result in the center of gravity being shifted somewhat farther forward, to the position g'. By virtue of this, the rotor center may be mounted somewhat farther forward, with the rotor lift line l'—l' correspondingly advanced in position, so that the gasoline, luggage, and passenger loads are almost directly superimposed, on a line with the rotor lift.

Without further amplification of the operation of the machine (either of the form of Figures 1 to 7, or the form of Figure 8) it will now be clear, from the detailed description of the mechanism which has been set forth, how the numerous objects and advantages set forth at the beginning of this specification are obtained.

We claim:

1. An aircraft having an autorotationally actuable sustaining rotor, a propulsive airscrew, and an engine for driving the airscrew, in which the airscrew is mounted in the nose of the aircraft on a substantially horizontal axis, in which the sustaining rotor is mounted above the airscrew on a generally upright axis spaced appreciably behind the airscrew, and in which the engine is positioned with its center of gravity below the axis of the airscrew behind the axis of the rotor, the engine further being positioned with its axis inclined upwardly and forwardly to pass through the airscrew generally centrally thereof.

2. In an aircraft having a pivoted-wing sustaining rotor and a load compartment therebeneath, an engine positioned with its mass center in a plane below the center of gravity of the craft and in the horizontal plane of said compartment to the rear thereof, a pair of propellers mounted forwardly of said compartment, a gear box associated with the engine and taking power therefrom, a gear box associated with said propellers to deliver power thereto, and longitudinally extending shafting interconnecting said gear boxes.

3. In an aircraft having a pivoted-wing sustaining rotor and a load compartment therebeneath, an engine positioned with its mass center in a plane below the center of gravity of the craft and in the horizontal plane of said compartment to the rear thereof, a pair of propellers mounted forwardly of said compartment, a gear box associated with the engine and taking power therefrom, a gear box associated with said propellers to deliver power thereto, and longitudinally extending shafting interconnecting said gear boxes, the propellers being mounted on concentric axes positioned substantially horizontally on a plane close to the center of gravity of the craft and above the center of the engine, the shafting extending forwardly from said engine at an upwardly inclined angle with relation to said plane, and the forward gear box including gearing accommodating the angle between said shafting and the propeller axes.

4. In an aircraft having a pivoted-wing sustaining rotor and a load compartment therebeneath, an engine positioned with its mass center in a plane below the center of gravity of the craft and adjacent the rear of said compartment, a pair of propellers at the nose of the craft forwardly of the compartment, a pair of concentric drive shafts extending forwardly from said engine, coupled respectively to the two propellers, and a gear box associated with the engine including means for driving one of said shafts directly with the engine crank shaft and gearing for driving the other of said shafts in the opposite direction, whereby the body of the craft is relieved of torsional stresses of the drive between the engine and propellers.

5. In an aircraft, a sustaining rotor, propulsion means located below and forwardly of the rotor center, engine means located below the rotor and spaced well to the rear of the propulsion means, whereby the center of the rotor, the center of the propulsion means, and the center of the engine means are arranged to define the three points of a triangle in the generally vertical longitudinal mid-plane of the craft, and major structural members substantially defining the three sides of the triangle and serving to support and interbrace the rotor, the propulsion means, and the engine.

6. In an aircraft, a sustaining rotor, propulsion means located below and forwardly of the rotor center, engine means located below the rotor and spaced well to the rear of the propulsion means, whereby the center of the rotor, the center of the propulsion means, and the center of the engine means are arranged to define the three points of a triangle in the generally vertical longitudinal mid-plane of the craft, a body or fuselage structure beneath the rotor and enclosing the engine means, and a generally triangular bracing structure comprising a central longitudinal member interbracing the engine means and the propulsion means, and two downwardly divergent pylon legs for supporting the rotor, the forward leg extending to a point adjacent the propulsion means and the rear leg to a point adjacent the engine means.

7. In an aircraft having a sustaining rotor, an undercarriage including a rear wheel, a propeller adjacent the nose of the craft, and an engine intermediate the propeller and wheel and positioned with its axis at an angle to the longitudinal axis of the craft, approximately on the location of a line drawn from the propeller to the wheel, a forwardly extending shaft connecting said engine to the propeller and a rearwardly extending shaft connecting said engine to the wheel, said shafts being of relatively light weight and directly connected for operation at engine speed, and reduction gearing connecting said shafts respectively to the propeller and the wheel.

8. In an aircraft having a body and a normally autorotative sustaining rotor thereabove, an engine enclosed in a compartment of the body, a propeller arranged to be driven by said engine, said engine being rearwardly removed from the propeller location to provide an occupant's space between them, means dividing the engine compartment from the occupant's space, means for cooling the enclosed engine comprising air inlet means adjacent the front of the engine space and air outlet means adjacent the rear thereof, and a blower fan associated with the engine, intermediate the inlet and outlet.

9. An aircraft including a pivoted-wing sustaining rotor, a propulsive airscrew, a landing wheel, an engine, a cooling fan for said engine, driving connections incorporating a clutch for interconnecting the engine and the airscrew, clutching means for connecting the fan to the engine, driving connections incorporating a clutch for connecting the engine to said wheel, and control means for said clutches and clutch means providing for alternative connection of either of said clutches and for connection of said clutch means for the fan when the airscrew clutch is disconnected.

10. In an aircraft having a body and an autorotatable sustaining rotor thereabove positioned on an upright axis, an occupant's compartment in the body beneath said rotor, propulsive airscrew means forwardly of said compartment, an engine positioned rearwardly of said compartment centered below the center of the airscrew means and having forwardly extending drive shafting, the axis of the engine and drive shafting being inclined upwardly and forwardly, a single reduction-gear unit located at the nose of the body and connecting the forward end of said drive shafting to said airscrew means, and a rotor drive shaft extending upwardly from said reduction-gear unit to the rotor hub.

11. In an aircraft having a body and an autorotatable sustaining rotor thereabove positioned on an upright axis, an occupant's compartment in the body beneath said rotor, propulsive airscrew means forwardly of said compartment, an engine positioned rearwardly of said compartment centered below the center of the airscrew means and having forwardly extending drive shafting, the axis of the engine and drive shafting being inclined upwardly and forwardly, a single reduction-gear unit located at the nose of the body and connecting the forward end of said drive shafting to said airscrew means, and a rotor drive shaft extending upwardly from said reduction-gear unit to the rotor hub, said shaft being gear-connected to the main shafting through said reduction-gear unit.

12. In an aircraft having a body and an autorotatable sustaining rotor thereabove positioned on an upright axis, an occupant's compartment in the body beneath said rotor, propulsive airscrew means forwardly of said compartment, an engine positioned rearwardly of said compartment centered below the center of the airscrew means and having forwardly extending drive shafting, the axis of the engine and drive shafting being inclined upwardly and forwardly, a single reduction-gear unit located at the nose of the body and connecting the forward end of said drive shafting to said airscrew means, a rotor drive shaft extending upwardly from said reduction-gear unit to the rotor hub, said shaft being gear-connected to the main shafting through said reduction-gear unit, and a disconnectible clutch for the rotor drive shaft adjacent said reduction-gear unit.

13. In an aircraft having a body and an autorotatable sustaining rotor thereabove positioned on an upright axis, an occupant's compartment in the body beneath said rotor, propulsive airscrew means forwardly of said compartment, an engine positioned rearwardly of said compartment centered below the center of the airscrew means and having forwardly extending drive shafting, the axis of the engine and drive shafting being inclined upwardly and forwardly, a single reduction-gear unit located at the nose of the body and connecting the forward end of said drive shafting to said airscrew means, an undercarriage comprising a rear wheel located close to the line of the engine axis but rearwardly of the engine, and a drive shaft extending rearwardly from said engine and connected to drive said wheel.

14. In an aircraft having an autorotatable sustaining rotor, an undercarriage including a rear wheel, a propeller at the front of the craft and an occupant's compartment back of said propeller, an engine located rearwardly of said occupant's compartment but forwardly of said wheel and positioned with its axis at an angle to the longitudinal axis of the craft, approximately on a line drawn from the propeller to the wheel, a forwardly extending shaft in general alignment with the engine axis for driving the propeller from said engine and a rearwardly extending shaft in general alignment with the engine axis for driving said wheel from the engine, said shafts being of relatively light weight and direct-connected for operation at engine speed, reduction gearing connecting the rear shaft to the wheel, and a single pair of reduction gears connecting the forward end of the front shaft to the propeller, by which arrangement a light weight transmission system, a low center of gravity, and a wide angle of vision from the occupant's compartment are secured.

15. In an aircraft having an autorotatable sustaining rotor, a propeller and an undercarriage wheel, an engine for driving the rotor, propeller and wheel, a disconnecting device for the wheel drive, the drive for the rotor including a shaft extended up from the nose of the craft to the rotor hub, and a disconnecting device common to the rotor and propeller drives.

16. In an aircraft having an autorotatable sustaining rotor, a propeller and an undercarriage wheel, an engine for driving the rotor, propeller and wheel, a disconnecting device for the wheel drive, the drive for the rotor including a shaft extended up from the nose of the craft to the rotor hub, a disconnecting device common to the rotor and propeller drives, and a supplemental throw-out for disconnecting the rotor when the last-mentioned device is connected.

17. In an aircraft having an autorotatable sustaining rotor and a body therebeneath, a propeller and gear-box unit positioned in said body forward of the rotor center, an engine in said body rearwardly of the rotor center, a drive shaft coaxial with the engine axis and extending directly therefrom to said gear box, and a driving connection extending upwardly from said gear box to said rotor.

18. In an aircraft, a sustaining rotor, propulsion means located below and forwardly of the rotor center, engine means located below the rotor and spaced well to the rear of the propulsion means, whereby the center of the rotor, the center of the propulsion means, and the center of the engine means are arranged to define the three points of a triangle in the generally vertical longitudinal mid-plane of the craft, major structural members substantially defining the three sides of the triangle and serving to support and interbrace the rotor, the propulsion means, and the engine, and a load space or compartment located beneath the rotor center and intermediate the engine and propulsion means.

19. In an aircraft, a normally air-rotated sustaining rotor, an engine and a propeller driven thereby, means for passing slipstream from said propeller over said engine to cool the same, means for disconnecting the drive to the propeller, a blower fan for cooling the engine, and means acting to assure connection of said blower fan for operation when said propeller is disconnected.

20. In an aircraft having a sustaining rotor, propulsion means for the craft, an engine normally cooled in flight by said propulsion means, a wheeled undercarriage, means for connecting said engine to the propulsion means, means for connecting said engine to a wheel of the undercarriage for road travel, and a blower for cooling the engine with means acting to positively assure operation of the same upon disconnection of the propulsion means.

21. An aircraft including a pivoted-wing sustaining rotor, a propulsion airscrew, an engine for driving the airscrew through a disconnectible drive, landing gear incorporating a wheeled axle, driving means operative only when the airscrew drive is disconnected for delivering power from said engine to said axle and incorporating clutch means, means for applying a braking force to the driven axle, and common means for controlling the braking means and the clutching means.

22. In an aircraft, a sustaining rotor with flappingly pivoted blades serving as the chief means of sustension, propulsion means located below and forwardly of the rotor center, engine means located below the rotor and spaced well to the rear of the propulsion means, an occupant's compartment located between the engine means and the propulsion means substantially in the horizontal plane of the latter, whereby the center of the rotor, the center of the propulsion means and the center of the engine means are arranged to define the three points of a triangle in the generally vertical longitudinal mid-plane of the craft, and whereby the occupant's compartment is substantially centered below the center of the rotor, the propulsion means including a pair of propellers driven by the engine means in opposite directions and located with their axes lying substantially in a horizontal plane containing the center of gravity of the craft as a whole, whereby pitching and rolling due to increase and decrease of power delivered to the propulsion means is minimized, and the engine means having its mass center located a substantial distance below said horizontal plane, whereby the center of gravity is lowered to the said horizontal plane, thus increasing the available clearance for the flapping rotor blades over said propulsion means.

23. In an aircraft, a propulsion engine, a sustaining rotor and a propeller arranged with their centers defining a triangular figure, with the engine center appreciably below the other two centers, a mounting shaft for the propeller, drive-shafting extended on one leg of said triangle at an angle to the propeller shaft between the engine and the propeller, drive-shafting extended on another leg of said triangle between the propeller and the rotor, drive means for interconnecting the propeller shaft and the adjacent end of the first shafting, and drive means including a clutch for interconnecting the propeller shaft and the adjacent end of the second shafting.

24. In an aircraft, a propulsion engine, a sustaining rotor and a propeller arranged with their centers defining a triangular figure, with the engine center appreciably below the other two centers, a mounting shaft for the propeller, drive-shafting extended substantially on one leg of said triangle between the engine and the propeller, drive-shafting extended on another leg of said triangle between the propeller and the rotor, drive means for interconnecting the propeller shaft and the adjacent end of the first shafting, and drive means including a clutch for interconnecting the propeller shaft and the adjacent end of the second shafting.

25. In an aircraft, a propulsion engine, a sustaining rotor and a propeller arranged with their centers defining a triangular figure, with the engine center appreciably below the other two centers, a mounting shaft for the propeller, drive-shafting extended on one leg of said triangle at an angle to the propeller shaft between the engine and the propeller, drive-shafting extended on another leg of said triangle between the propeller and the rotor, drive means for interconnecting the propeller shaft and the adjacent end of the first shafting, drive means including a clutch for interconnecting the propeller shaft and the adjacent end of the second shafting, and a clutch in the drive-shafting first mentioned common to the drive to the propeller and to the rotor.

JAMES G. RAY.
HAROLD F. PITCAIRN.
AGNEW E. LARSEN.